Aug. 27, 1940.    O. W. DIEFFENBACH    2,212,915
MACHINE FOR MAKING DRINKING AND SIMILAR TUBES
Original Filed Jan. 24, 1934    2 Sheets—Sheet 2
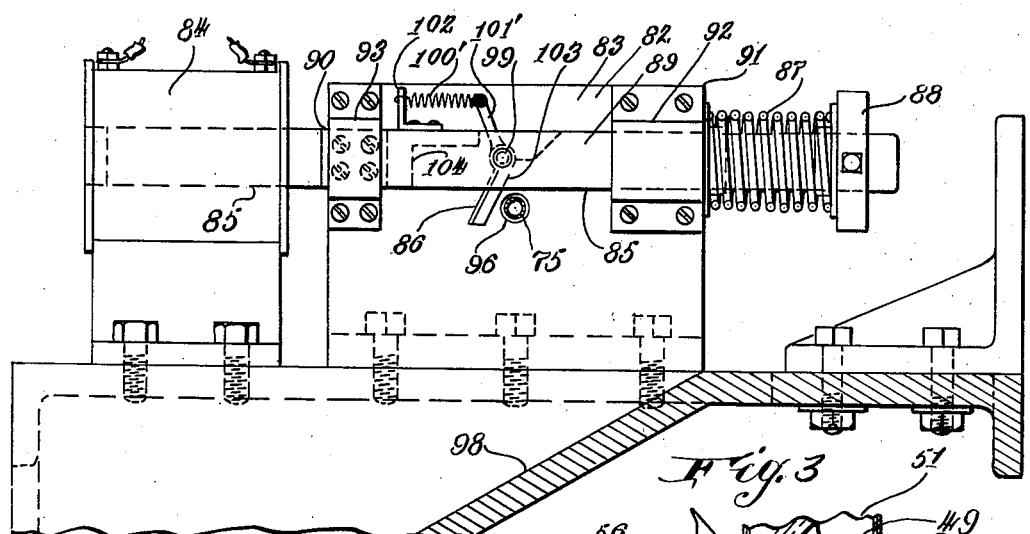
Fig. 3
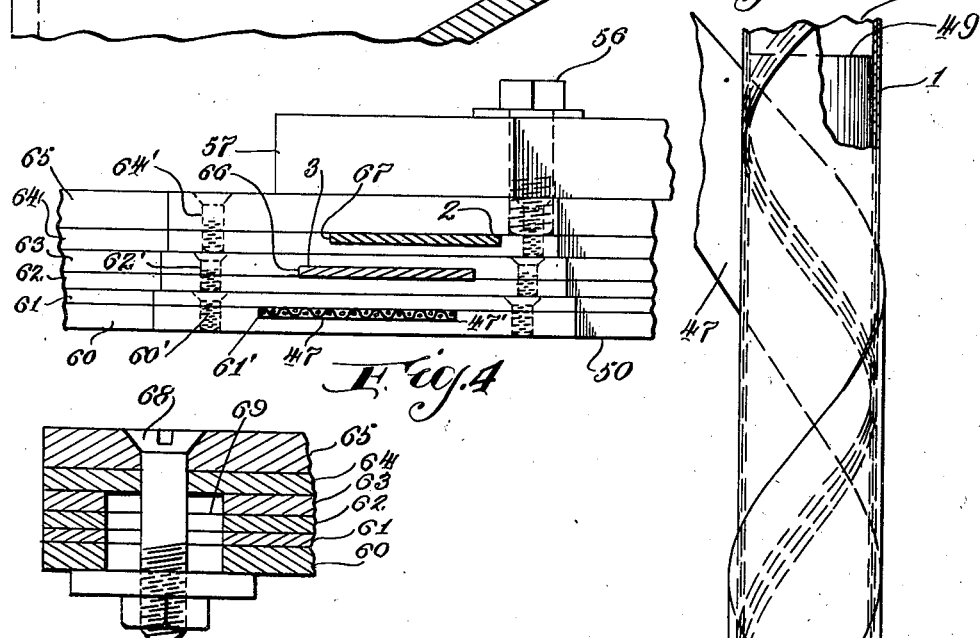
Fig. 4
Fig. 5
Fig. 6
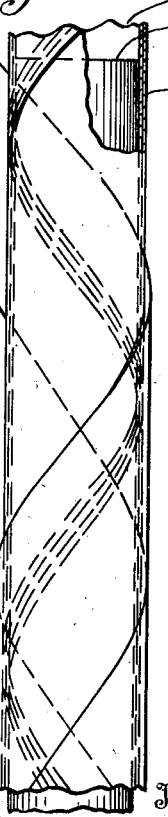

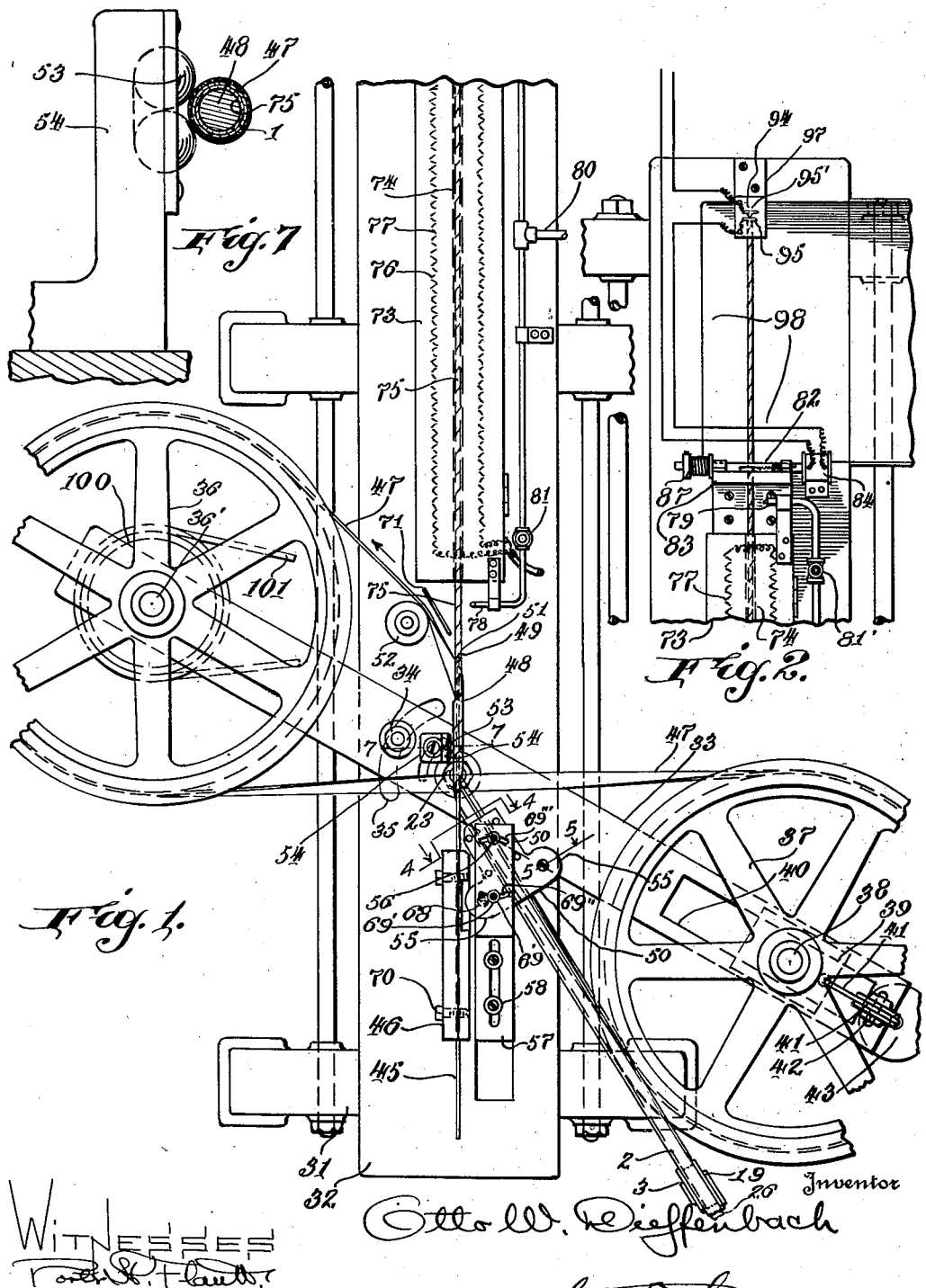

Patented Aug. 27, 1940

2,212,915

UNITED STATES PATENT OFFICE 2,212,915

MACHINE FOR MAKING DRINKING AND SIMILAR TUBES

Otto W. Dieffenbach, Baltimore, Md.

Original application January 24, 1934, Serial No. 708,064. Divided and this application March 20, 1936, Serial No. 69,998

12 Claims. (Cl. 93—80)

The invention relates to a machine for making helically wound tubes of transparent cellulose derivative or other transparent flexible material having the properties hereinafter described, the tubes being particularly adapted for use in partaking of beverages and commonly known as drinking straws, though they are capable of more general use. The present application is a division of application 708,064, filed January 24, 1934, Patent No. 2,035,304 having since issued thereon said application No. 708,064, having been in part a continuation of application No. 682,860, filed July 29, 1933, on which Patent No. 1,944,970 was granted.

In accordance with the preferred practice of the invention, the material, which is preferably transparent sheet cellulose derivative in strip form, is wound helically about a mandrel and the tube immediately after it leaves the mandrel, is passed through a heated area or oven which seals the overlapping edges of the helically wound strips thus forming an integral tubular structure. To effect sealing in this way, a self adhesive sheet material is employed or the sheet material may be wholly or partly coated with a cement which is self adhesive when heated. There is not only no tendency for the tube to unwind in the oven, but on the contrary, a reduction in diameter is effected by heating, the overlapping portions being drawn tightly together and sealed. The tube is then cut automatically into suitable lengths, the cutting operation being performed as the tubing emerges from the heated area.

It is of interest that in passing the tubing through the oven, advantage is taken of the fact that the tubing is stiff enough to be self-supporting beyond the mandrel and is passed through the oven by the feeding impulse due to winding, eliminating the necessity for any tension device to draw the tube through the oven, which tension device would tend to draw the successive turns of the tubes apart, to mar the surface of the tube and possibly throw it out of round and injure its appearance. Also the tube is preferably supported out of contact with the heater, such contact being objectionable on account of the tendency of contact with heated surfaces to shrivel the material. It will be understood that due to the winding action the tube rotates as it advances, the mandrel being stationary.

It is further of interest that while the drinking straws or tubes can be made of a single layer of sheet cellulose, the term being used to describe the various cellulose compounds or derivatives of a transparent nature adapted for use in this way, the spiral ribs or thickened portions due to the overlapping of the successive turns of the helix being utilized as a reinforce to strengthen the tube, the tubes thus manufactured of a single layer in order to be sufficiently stiff to stand up in use, must be of such thickness as to require the use of sheet cellulose of a thickness which would make the tube relatively expensive as compared to the paper tubes now in use. However, the invention contemplates the manufacture of a single layer and also of any other number of layers.

Various details and features of the product, and the machine by which the manufacturing operation is practiced are made apparent in the drawings and the description which follows.

In the accompanying drawings, I have illustrated a machine embodying the features of the invention in the preferred form together with the operation by which the method of the invention may be carried into effect.

In the drawings:

Figure 1 is a top plan view of a machine adapted to produce transparent tubes in accordance with the method of the invention, the rear end of the machine being broken away for convenience of illustration.

Figure 2 is a fragmentary plan drawn to the same scale and showing the rear end of the machine, the portion shown extending backwardly from Figure 1 where the illustration is broken away.

Figure 3 is a front elevation of the cutter for severing the straws as they come from the winding machine, the delivery trough being shown in section.

Figure 4 is a section on the line 4—4 in Figure 1 showing the manner of feeding the strips or bands of material of which the straws or tubes are composed to the winding machine and their relation to the belt.

Figure 5 is a section on the line 5—5 in Figure 1 showing the anti-friction support for the mandrel.

Figure 6 is a fragmentary plan view of the mandrel on an enlarged scale showing the relation of the winding belt to the mandrel, and the material being wound thereon to form the tube.

Figure 7 is a view on line 7—7 in Figure 1 of the mandrel guide.

Referring now to Figures 1 and 2, the machine as shown comprises a frame 31 having a bed plate 32 which as shown is substantially horizontal. This bed plate carries a horizontal transverse arm 33 which extends across and beyond the bed plate on each side, being shown as disposed at an angle of about forty-five degrees to the length of the bed plate. This arm is shown as pivoted at the center on a bolt or pin 23 extending downwardly through the bed plate 32 and is secured in any desired position of adjustment by means of a second bolt 34, which passes downwardly through the arm and engages an arcuate slot 35 in the bed plate, concentric with the pin or bolt 33.

In the form of machine shown the driving pulley 36 is mounted on the arm 33 at the left end on a suitable shaft 36' having a bearing in the arm extending downwardly in a vertical direction. A suitable rotary motion is imparted to the shaft whereby the machine is driven in its operation. The drawing shows a pulley 100 on this shaft under the arm 33. This pulley is driven by belt 101 driving pulley 36.

The opposite end of the arm 33 carries a driven pulley 37 which rotates on a shaft 38 which may be mounted in a block 39 to slide in a slot 40 in said arm 33. The slot extends in the direction of the length of the arm 33. As a means for maintaining the tension of the belt a cord or chain 41 is attached at one end to the block 39 and passed downwardly over a pulley 42 carrying at its lower end a weight 43.

A mandrel 45 is secured in a suitable clamp 46 mounted on the bed plate near the lateral centre. The mandrel extends along the bed plate and is spaced upwardly therefrom into the plane of the pulleys 36, 37 which rotate in a horizontal plane. The pulley 37 is driven from the pulley 36 by a crossed belt 47 which is wrapped helically about the mandrel, the helical portion being indicated at 48. The delivery end of the mandrel is indicated at 49. In accordance with the construction shown the belt 47 is wrapped about the mandrel when it is placed on the pulley. The mandrel being stationary or non-rotary, the belt is drawn off the mandrel by the drive pulley 36 which thus drives the pulley 37 and draws the cellulose strips forwardly wrapping them about the mandrel to form the tube.

The driven pulley 37 delivers the belt through the guide 50 to be further described to the under side of the mandrel about which it is rolled helically in clockwise rotation in the form of the invention shown. The belt is drawn from the under side of the mandrel at the end remote from the observer in Figure 1, the point of delivery being indicated by reference character 51. The belt just beyond the point of delivery is turned into a plane tangent to the drive pulley 36 by a guide roller 52 which serves to maintain the upper end of the helix in a constant and unvarying location, thus contributing to the uniformity of the helical winding of the tube, the mandrel 45 being necessarily of small diameter, is supported against the tension of the belt by a ball bearing guide 53 mounted in a suitable bracket 54. This is shown in detail in Figure 7.

The guide 50 which like the other elements of the machine may be subject to more or less variation in design, in the form of the invention shown is mounted on an overlying supporting plate 57, see Figures 1 and 4. The guide comprises registering horizontal plates through the topmost of which 65 is passed bolt 56 by which the guide is secured to the supporting plate 57. This support is carried by bracket 55 mounted for adjustment along the machine base and in turn secured by bolts 58. The guide proper 50 comprises a series of plates 60, 61, 62, 63, 64, 65, Figure 4, which are secured together in pairs by screws 66. The bottom pairs of plates 60, 61 serve as a guide for the belt 47, the lower plate 60 being slotted in its upper surface, the slot being covered by the plate 61 to provide an opening 61' through which the belt passes and by which it is guided and presented to the underside of the mandrel 49 at the proper angle. These plates 60 and 61 are secured to each other in assembled relation by the screws 66', as already pointed out. The next pair of plates counting upwardly, indicated by reference characters 62 and 63, are secured together by screw 62' and the upper plate 63 is slotted or apertured as to its lower surface to form an aperture 66 through which the lower or outside sheet 3 of cellulose or regenerated cellulose or other suitable material is fed, this strip being indicated by reference character 3. The next pair of plates overlying the plate 60 are numbered respectively 64 and 65. These are secured to each other by two screws 64' and the bottom plate 64 is slotted or apertured as to its upper surface to provide an opening 67 through which the upper or inside strip of material 2 is fed.

The regenerated cellulose or other transparent strips indicated by reference characters 2, 3 in Figure 1 are fed to the guide 50 from any suitable retaining device suitably mounted to deliver the material but not shown. It is of importance in connection with the plates 61, 62, 63, 64, 65 that these plates are secured together as a whole in the relation shown or any suitable adjusted relation by screws or screw bolts 68 passed through ears 55 formed on the plate, see Figures 1 and 5. These screws fit closely in the upper plates and are passed through slots 69 in the plates 60, 61, 62 and 63, and are secured at the bottom by means of a nut, the bolt being passed through a suitable washer which underlies the slots. The lateral adjustment of the strips of material 2 and 3, already referred to, is obtained by sliding the plates 62, 63 as one laterally in their relation to the plates 64, 65. The position and angle of feed of the belt may be adjusted by sliding the plates 60 and 61 together relatively to the other plates. The adjustment shown in Figure 4 is one which has been found satisfactory, serving to present the strips of material to the mandrel causing them to be wound substantially in the relation illustrated. To obtain the arrangement of the strips overlying each other in exact registration so that they have the effect of a single strip of double thickness with their edges overlapped, in the final construction, the plates 62 and 63 are so adjusted as to bring the slot 66 directly beneath the slot 67. To obtain the arrangement shown in which the edges of the strips are offset as in Figure 6 of my said application on which Patent #2,035,304 has issued, producing the tube illustrated in Figures 4 and 5 of the application, the plates 62—63 and 64—65 are so arranged as to give the offset illustrated in Figure 6 of said application, the angle of the belt and the angle of the feed being such as to cause the overlapping of the successive turns to be equal to this offset so that the edges of the strips abut as shown at 10'' and 10''', particularly in Figure 5 of said application.

The angle at which the belt 47 is delivered to the mandrel 45 is changed under these circumstances by turning the entire guide 50 sliding the bolts 56 and 69 in their concentric arcuate slots 69'' and 69''' in the overlying support 57. By changing this angle the overlap of the successive turns of the helical winding is varied and determined. The location of the guide may also be changed by moving bracket 57.

It is of interest that the position of the operative end of the mandrel remote from the observer in Figure 1 may be adjusted by moving the mandrel through the clamp 46 and securing it in any desired position of adjustment by tightening the bolts 70 and that weaving of the belt with consequent displacement and variation of the helical portion 48 and consequent variation of the tubes are prevented by the guide pulley 52 and the cooperating stationary guide 71, the belt 47 being led off the mandrel between the guide pulley 52 and said guide plate 71, which overlies the guide pulley. The belt 47 passes between the pulley 52 and stationary guide plate 71 as the said belt leaves the mandrel definitely locating the point where the belt leaves the mandrel. These elements 52 and 71 cooperate with the guide 50 to maintain constant the angle or pitch of the helix of the belt and also the angle or pitch of the tube winding.

An important feature of the invention is found in the stove or heater shown fragmentarily in plan at 73 in Figure 1, the rear end of the heating element together with the cutter and trough to be further described, being shown in Figure 2.

The heater 73 is spaced off rearwardly from the rear end 49 of the mandrel 45, in order to provide for the free delivery of the belt 47 to the drive pulley 36 and for the placing of the guide pulley 52 and plate 71, also to prevent heating of the material by radiation before it leaves the mandrel and to provide for the contraction of the tube due to heating which otherwise might tend to cause the material to stick to the mandrel due to binding of the tube about the mandrel. This contraction has an important effect in the welding or sticking of the joints of the tube. In other words, the spacing of the heater from the mandrel provides for the contraction of the tube in the space between the mandrel and the heater and incidentally provides room for the fingers of the operator to engage the tube after it comes from the mandrel and insert it in the heater. To prevent unwinding of the tube at this point, the end may be twisted or rosetted when first introduced, but this has not been found necessary, as there has been no perceptible tendency of the tube to unwind after it has been formed on the mandrel and fed forwardly in the manner described.

As shown, the heater 73 is formed with an opening or hole 74 extending longitudinally through the heater in line with the mandrel, the hole being somewhat larger than the tube to provide a clearance as shown between the tube 75 and the walls of the hole or opening 74. The tube is merely heated by radiation and conduction from the heating unit 76 whereby the material which is preferably regenerated cellulose is rendered self adhesive and the contraction of this material which is found to be incidental to this operation presses the joints tightly together and assists in joining the overlapping edge portions of the successive helices and the adjacent surfaces of the overlying multiple strips indicated by reference characters 2 and 3 in Figure 1 herein and by reference characters 2 and 3 in Figures 1, 2 and 3 of said application 708,064 and by reference characters 9 and 10 in Figures 4, 5 and 6 of said application also joining all contacting portions of the material after winding and heating as described.

It is of interest that the heater 73 in the development of the invention to date is composed of two grooved sections placed with the grooves in registration to form the opening 74, and the parallel opening 77 containing the heating units or coils 76, the two halves or sections being combined to form the completed heater or oven. The temperature is controlled by a thermostat (not shown).

While tubes which are entirely satisfactory and of commercial quality have been made without this provision, the construction, Figure 1, shows spray nozzles 78 and 79 directed at the tube as it enters and leaves the heater or oven, the purpose being to spray the tube with a solution of a cellulose ester dissolved in a volatile solvent, serving to coat the tube with this material, thus increasing its resistance to bending, increasing its lustre and dust shedding properties and improving its appearance. The liquid coating which may be of any desired composition, is supplied to the nozzles by way of a pipe 80 from a convenient source of the liquid coating material under pressure. The supply to each nozzle is controlled by valves 81 and 81' located in the tube adjacent the respective nozzles.

Another feature of the apparatus which in some form, is essential to the production of these straws in a commercial way, consists in the cutter unit 82 carried by a bracket 83 on the base 32. The cutter is shown in elevation in Figure 3 and in plan on a small scale in Figure 2. The cutter blade 86 in the form of the invention shown is actuated by a solenoid or electro magnet 84, the core of which 85 moves the blade 86. This blade as shown is advanced by the action of the solenoid and retracted by a spring 87 which bears at one end against a collar 88. The collar is secured to the shaft 89 which is an extension of the solenoid core 85. The other end of the spring bears against the slide bearing 92, which carries the shaft 89 or any other suitable abutment. The bracket also carries a second slide bearing 93 for the shaft 89. This is adjacent the solenoid or coil 84.

The operation of the cutter is controlled by a switch 94 which is normally open, the forward contact 95 being in the form of a very flexible spring plate and the rear contact 95' being stationary. This switch is back of the bracket 83 which is apertured at 96 to pass the straw, the switch plates being mounted on a suitable overlying support 97 from which they depend in line with the opening 96. The tube or straw is fed forwardly by the operation of the helical portion 48 of the belt. The tube is thus formed and fed forwardly rotating as it advances. As the end of the tube comes in contact with the switch 94 which is spaced backwardly from the cutter by a length corresponding to the desired length of the straws, the switch is closed by the thrust due to the feed of the straw tube, and the solenoid is operated, advancing the cutter blade 86 to the position shown in Figure 3, thus severing the length of tube between cutter bracket 83 and switch 94 in Figure 2. This length of tube is thus dropped on the inclined delivery plate 98 from which it rolls into a suitable receptacle. The switch is then permitted to open due to recovery of the spring member 95 from the thrust of the tube, and the current being thus broken the solenoid coil is deenergized and the core 85 of the solenoid and the shaft 89 are withdrawn by the spring 87 to the right in Figure 3. Then the newly produced straw advances with great speed toward the cutter, so that it is difficult if not impossible to avoid contact of the cutter with the straw on the back stroke which might tend to deflect and distort the straw or tube. For this reason the cutter is pivotally mounted as shown at 99 and a tendency to return to the cutting position is imparted to it by a light helical spring 100' connected to an upwardly disposed arm 101' of the cutter, the spring being oppositely secured to a bracket 102. The cutter blade 86 which in cutting position is preferably inclined, to give the desired shearing action is supported in cutting position and backward rotation is prevented by an abutment surface 103, the cutter being mounted in a suitable slot 104 in the shaft 89, said abutment surface 103 being as shown a wall of said slot.

The operation briefly described is that the cutter blade 86 being held against the abutment surface 103 by the spring 100' is advanced and severs the straw when its forward end due to the action of the helical portion of the belt advances into contact with the switch 94. The cut straw is then dropped and on the return stroke, assuming that a new length of the material is advanced through the opening 96 the cutter coming in contact with the straw, the spring 100 yields to the lateral resistance of the tube and the cutter swings upwardly to be returned to cutting position prior to the forward or cutting stroke by spring 100. Then the newly cut end of completed tube advances into contact with the switch 94 closing the same and actuating the solenoid for a second stroke to cut a second length of tube and so on.

In the operation of the machine the strip cellulose material as illustrated by strips 2 and 3 is fed through the guide 59 by the belt 47 which is wound about the mandrel at 48 thus overlying the strip material which is fed to the lower side of the mandrel from the right and thus rolled about the mandrel in helical form by the belt. The tube thus formed, is at the same time fed forwardly into the oven 73. The driving of the belt is effected by pulley 36 which turns counter clockwise drawing the belt from the helical portion on the mandrel and leaving the material in the form of a helically wound tube as already described. The belt is driven at a high speed so that the tube advances rapidly through the oven.

The opening 74 in the oven being of greater diameter than the tube, provides for the spacing of the tube away from the heating surface surrounding the opening. This method of heating is considered better than the well known expedient of heating and pressing, and as the contact of this material with the heater has been found to result in shrivelling, the tube is led through the oven without difficulty incident to unrolling, first on account of the tightness with which it is wound about the mandrel which causes it to take a permanent set, and further, because when it is once introduced into the oven, the portion in and beyond the oven immediately becomes welded or stuck so that there is no tendency for it to unroll, the winding operation being continuous, there is a continuous torque applied to the portion of the tube not only on the mandrel but between the mandrel and oven the torque being applied in the direction of the rolling. As already pointed out, any tendency which might be encountered incident to the tendency of the tube to unroll before it is inserted in the oven can be overcome by twisting the free end of the tube beyond the mandrel or forming a rosette, as it is called, however no such difficulty has been encountered in the manufacture of the tubing to date.

While it is not essential to the production of a commercial tube, provision may be made for spraying the tube with cellulose esters or similar drying solution, both as it enters and leaves the oven, whereby a hard lustrous coating would be provided on the outer surfaces of the tube. While there is but a single nozzle in each spraying position, the entire surface of the tube is coated because of the fact that the tube as it is formed and fed forwardly is in rapid rotation and it is further within the scope of the invention to rely on the adherent properties of the solution thus sprayed to cause the successive turns of the helix to adhere in the absence of heating. The heating step is, however, of great advantage, producing a tube of more satisfactory and permanent construction at a much lower cost.

As explained above, the tube shrinks in diameter somewhat between the mandrel and the point of delivery from the oven. The shrinkage of the tube together with the self adhesiveness of the material which results from heating has the effect of joining tightly together by welding or sticking, which ever term may be preferred, both the overlapping edges of the successive turns of the helix and the overlying strips of material so that the completed tube has a substantially permanent construction which strongly resists disintegration and will retain its shape and resiliency indefinitely in any kind of drink, whether it be hot or cold, charged with gas or containing a high percentage of alcohol.

As the tube is advanced beyond the oven, it is cut into a series of straw lengths by the operation of the cutting mechanism 82 which is controlled and tripped by the tube as it advances, the switch 94 which is operated by the forward end of the tube being spaced forwardly from the cutter by a distance coresponding to the desired predetermined length of the straws. This switch is formed of depending spring plates 95, 95', supported on the lug or plate 97 which overlies the forward end of the tube in its advanced position. The straw lengths as cut are dropped on the chute 98 whence they roll downwardly, into a suitable receptacle.

I have thus described specifically an apparatus for manufacturing tubes which contains numerous features of invention which contribute to the efficiency and to the degree of perfection with which the tube is produced, the description being specific and in detail in order that the manner of constructing, applying, operating and using the invention may be fullly understood, however, the specific terms herein are used in a descriptive rather than in a limiting sense, the scope of the invention being defined in the claims.

What I claim as new and desire to secure by Letters Patent is:

1. A machine for making tubes of sheet cellulose material having self adhesive properties when heated, the same comprising a mandrel, a belt wound helically around the mandrel, a guide for presenting strips of the tube material to the mandrel and a heater in line with the mandrel and beyond the same in the direction of the feed, the heater having an aperture in line with the mandrel.

2. A machine for making tubes of sheet cellulose material having self adhesive properties when heated, the same comprising a mandrel, a belt wound helically around the mandrel, a guide for presenting strips of the tube material to the mandrel and a heater in line with the mandrel and beyond the same in the direction of feed, the heater having an aperture in line with the mandrel of a diameter greater than the diameter of the resulting tubes so that the heater surface is spaced away from the tube as it is fed forwardly through the heater.

3. In a machine for making tubes of sheet cellulose material, the same having a mandrel, a belt wound helically about the mandrel, means for presenting strips of the material to the mandrel beneath the belt, the same comprising a guide having a guide member for the belt and a guide member for each strip, the respective strip guide members being laterally adjustable relatively to each other, to determine the offset and alignment of the respective strips as they are fed to the mandrel and a heater through which the tubes pass from the mandrel.

4. In a machine for making tubes of sheet cellulose material, the same having a mandrel, a belt wound helically about the mandrel, means for presenting strips of the material to the mandrel beneath the belt, the same comprising a guide having a guide member for the belt and a guide member for each strip, the respective guide members having means whereby they are secured in a plurality of different positions spaced laterally of the length of the belt, whereby said members are adjustable to determine the angle and the overlap of the successive turns of the helix.

5. In a machine for making tubes of sheet cellulose material, the same having a mandrel, a belt wound helically about the mandrel, means for presenting a plurality of strips of the material to the mandrel beneath the belt, the same comprising a guide having a guide member for the belt and a slotted guide member for each strip, through which slots the respective strips pass the respective guide members having means whereby they are secured in a plurality of different positions spaced laterally of the length of the belt, whereby said members are adjustable to determine the angle and the overlap of the successive turns of the helix and an antifriction guide engaging the helical portion of the belt on the mandrel to prevent deflection of the mandrel due to tension of the belt.

6. In a machine for making tubes of sheet material which is self-adhesive when heated, a mandrel and means for bending a plurality of strips of said material one over the other, about the mandrel in the form of a tube, the edges of the strips overlapping, a heater beyond the mandrel through which the tube is passed.

7. A machine for making tubes of material which is self adhesive when heated, the same comprising a mandrel, means for imparting to the material a continuous tubular form about the mandrel and advancing it from the mandrel as it is formed and a heater beyond the mandrel in the direction of the feed adapted to heat and seal the continuous tube as it passes and means beyond the heater in the direction of feed for severing pre-determined lengths of the tube.

8. A machine for making tubes of material which is self adhesive when heated, the same comprising a mandrel, means for imparting to the material a continuous tubular form about the mandrel and advancing the tube from the mandrel as the tube is formed, and a heater beyond the mandrel in the direction of the feed adapted to heat and seal the tube as it passes, the heater having an aperture in line with the mandrel, of greater diameter than the tube, through which aperture the continuous tube is passed in the direction of its length in the sealing operation.

9. A machine for making tubes of continuous strips of material which is self adhesive when heated, the same comprising a mandrel, means for imparting to the material a continuous tubular form by winding helically about the mandrel and advancing it from the mandrel as it is formed and a heater beyond the tube contacting portion of the mandrel in the direction of the feed adapted to heat and seal the tube as it passes, the heater having an aperture in line with the mandrel of greater diameter than the tube, through which aperture the tube is passed in the sealing operation, the tube being supported free of contact with the heater.

10. A machine for making tubes of continuous strips of sheet material, including portions which are self adhesive when heated, the same comprising a mandrel, means for winding the material helically about the mandrel with the edges of the self-adhesive material in contact and feeding it forwardly from the mandrel, a heater in line with the mandrel spaced forwardly of the tube-contacting portion of the mandrel in the direction of feed so that the continuous tube passes from the mandrel into heating relation with the heater, sealing the tube by the self adhesive properties of the material.

11. A machine for making tubes of continuous strips of sheet material, including strips which are self adhesive when heated, the same comprising a mandrel, means for winding the material helically about the mandrel with the edges of the self-adhesive material in contact, thus forming a continuous tube and feeding the tube forwardly from the mandrel, a heater in line with a mandrel spaced forwardly therefrom in the direction of feed so that the tube passes from the mandrel into heating relation with the heater, sealing the tube by the self adhesive properties of the material, the relationship between the mandrel and the heater being such that the tube does not contact the heater.

12. A machine for making tubes of sheet material in strip form, portions of which, sufficient to seal the tube, are self adhesive when heated, the machine comprising a mandrel, means for forming the material into a tube about the mandrel with the edges of the adhesive material in contact and for advancing the tube as formed, a heater beyond the mandrel, the heater having an aperture through which the tube is passed in heating relation thereto which seals the tube and a cutter beyond the heater, the cutter comprising a solenoid, having a core in cooperative relation thereto, a blade movably mounted on the core, a spring to retract the core, a spring of minute tension to bring the cutter to operative position on the core, permitting it to yield to the tube on the return stroke and a switch in circuit with the solenoid and in the path of the tube to be operated by the tube, to complete the circuit as the tube advances, energizing the solenoid to operate the cutter.

OTTO W. DIEFFENBACH.